(12) United States Patent
Yang et al.

(10) Patent No.: US 11,670,971 B2
(45) Date of Patent: Jun. 6, 2023

(54) WIRELESS POWER TRANSMISSION DEVICE AND FOREIGN OBJECT DETECTION METHOD THEREOF

(71) Applicant: Delta Electronics (Shanghai) Co., Ltd., Shanghai (CN)

(72) Inventors: Gang Yang, Shanghai (CN); Yongkai Liao, Shanghai (CN); Xuecong Xu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/447,292

(22) Filed: Sep. 10, 2021

(65) Prior Publication Data

US 2022/0149667 A1 May 12, 2022

(30) Foreign Application Priority Data

Nov. 12, 2020 (CN) .......................... 202011260413.5

(51) Int. Cl.
*H02J 50/60* (2016.01)
*H02J 50/12* (2016.01)

(52) U.S. Cl.
CPC .............. *H02J 50/60* (2016.02); *H02J 50/12* (2016.02)

(58) Field of Classification Search
CPC .................................. H02J 50/60; H02J 50/12
See application file for complete search history.

(56) References Cited

U.S. PATENT DOCUMENTS

| 11,056,922 B1* | 7/2021 | Shostak | H02J 50/10 |
| 2008/0094027 A1* | 4/2008 | Cho | H02J 50/12 320/108 |
| 2012/0313579 A1* | 12/2012 | Matsumoto | H02J 50/12 320/108 |
| 2014/0320090 A1* | 10/2014 | Keeling | B60L 53/12 307/104 |

(Continued)

FOREIGN PATENT DOCUMENTS

| CN | 102998711 A | 3/2013 |
| CN | 107005094 A | 8/2017 |

(Continued)

*Primary Examiner* — Daniel Kessie
*Assistant Examiner* — Brian K Baxter
(74) *Attorney, Agent, or Firm* — CKC & Partners Co., LLC

(57) ABSTRACT

The present application provides a wireless power transmission device and a foreign object detection method thereof. The method includes: acquiring an input current of a transmitting unit of the wireless power transmission device and a temperature of a transmitting coil in the transmitting unit; determining a first current reference value according to the temperature of the transmitting coil; and determining a foreign object detection result according to the input current and the first current reference value corresponding to the temperature of the transmitting coil. By detecting the input current of the transmitting unit of the wireless power transmission device, it is determined whether there is a foreign object in a transmission space of the wireless power transmission device. Moreover, a temperature detection unit is added, and adjustment is made to a current threshold according to the temperature of the coil, thereby achieving more accurate foreign object detection.

18 Claims, 7 Drawing Sheets

(56) References Cited

U.S. PATENT DOCUMENTS

| | | | | |
|---|---|---|---|---|
| 2017/0018973 A1* | 1/2017 | Murayama | ............... | H02J 50/10 |
| 2017/0237278 A1* | 8/2017 | Zhang | ..................... | H02J 50/10 |
| | | | | 320/108 |
| 2017/0279310 A1* | 9/2017 | Il | ............................. | H02J 50/80 |
| 2019/0157914 A1* | 5/2019 | Watanabe | ................ | H02J 50/12 |
| 2019/0319494 A1* | 10/2019 | Park | ........................ | H02J 50/12 |
| 2020/0021143 A1* | 1/2020 | Gonda | ................... | G01V 3/102 |
| 2020/0143982 A1* | 5/2020 | Rochford | ........... | G01R 19/0092 |
| 2021/0210984 A1* | 7/2021 | Peralta | .................... | H02J 50/20 |

FOREIGN PATENT DOCUMENTS

| | | |
|---|---|---|
| CN | 103997130 B | 5/2018 |
| CN | 108375796 A | 8/2018 |

\* cited by examiner

WIRELESS POWER TRANSMISSION DEVICE AND FOREIGN OBJECT DETECTION METHOD THEREOF

CROSS-REFERENCE TO RELATED APPLICATION

This application claims priority to Chinese Patent Application No. 202011260413.5, filed on Nov. 12, 2020, the content of which is hereby incorporated by reference in its entirety.

TECHNICAL FIELD

The present application relates to the field of foreign object detection technologies and, in particular, to a wireless power transmission device and a foreign object detection method thereof.

BACKGROUND

In an inductive wireless power transmission device, energy is transferred between a transmitting coil and a receiving coil through an alternating magnetic field. If there is a foreign object (including metals, ferromagnetic materials, etc.) between the two coils, a temperature rise or even a serious security incident will be incurred due to eddy loss and hysteresis loss generated in the alternating magnetic field. In order to avoid the above situation, it is usually necessary to perform foreign object detection before energy transmission from the transmitting coil. Once a foreign metallic object is found on the transmitting coil, power transmission is prohibited.

As widely used in the related art, whether there is a foreign metallic object is determined by means of detecting a Q-value of the transmitting coil. In calculating the Q-value of the coil, it is necessary to allow a resonant network (such as a resonant capacitor and an inductor for the coil) to operate at a resonant frequency, and by detecting a voltage $V_2$ across the transmitting coil and an input voltage $V_1$ of the resonant network, the Q-value of the coil is calculated according to $Q=V_2/V_1$. When there is a foreign metallic object in vicinity of the transmitting coil, the Q-value calculated through the detection will decrease. Since the voltage across the transmitting coil is very high at the resonant frequency, it is usually necessary to adjust the input voltage of the resonant network to a relatively small value. Therefore, this solution requires an additional voltage regulating circuit; moreover, it takes a long time to find the resonant frequency through frequency sweeping.

SUMMARY

The present application provides a wireless power transmission device and a foreign object detection method thereof to achieve a relatively accurate foreign object detection method with low implementation complexity and no extra hardware structure.

In a first aspect, the present application provides a foreign object detection method for a wireless power transmission device, including:

acquiring an input current of a transmitting unit of the wireless power transmission device and a temperature of a transmitting coil in the transmitting unit;

determining a first current reference value according to the temperature of the transmitting coil; and determining a foreign object detection result according to the input current and the first current reference value corresponding to the temperature of the transmitting coil, where the foreign object detection result is used for indicating whether there is a foreign object in a transmission space of the wireless power transmission device.

In a second aspect, the present application provides a wireless power transmission device, including: a transmitting unit, and a current detection unit, a temperature detection unit and a control unit respectively connected to the transmitting unit, where the control unit is respectively connected to the current detection unit and the temperature detection unit, and where:

the current detection unit is configured to acquire an input current of the transmitting unit;

the temperature detection unit is configured to acquire a temperature of a transmitting coil in the transmitting unit;

the control unit is configured to: determine a first current reference value according to the temperature of the transmitting coil provided by the temperature detection unit; and determine a foreign object detection result according to the input current provided by the current detection unit and the first current reference value, where the foreign object detection result is used for indicating whether there is a foreign object in a transmission space of the wireless power transmission device.

BRIEF DESCRIPTION OF DRAWINGS

Accompanying drawings herein are incorporated into the specification and form a part of the specification, which show embodiments consistent with the present disclosure and are used in conjunction with the specification to explain principles of the present disclosure.

Specific embodiments of the present disclosure have been illustrated with the foregoing drawings and will be described in detail below. The drawings and the textual description are not intended to limit the scope of the conception of the present disclosure in any way, but to explain concepts of the present disclosure to persons skilled in the art with reference to the specific embodiments.

DESCRIPTION OF EMBODIMENTS

Exemplary embodiments will be described in detail herein, examples of which are illustrated in the accompanying drawings. When the following description relates to the accompanying drawings, the same number in different drawings represents the same or similar elements unless otherwise indicated. Implementations described in the following exemplary embodiments do not represent all implementations consistent with the present disclosure. Instead, they are merely examples of devices and methods that are consistent with aspects of the present disclosure as detailed in the appended claims.

Terms such as "include" and "have" and any variation thereof in the specification, the claims and the drawings of the present application are intended to cover non-exclusive inclusion, e.g., processes, methods, systems, products or devices that encompass a series of steps or units are not necessarily limited to those steps or units that have been listed, but may alternatively include steps or units that are not listed or may alternatively include other steps or units inherent to these processes, methods, products or devices.

Firstly, introduction will be made to the application scenario involved in the embodiments of the present application.

The method according to the embodiment of the present application is applied to a wireless power transmission device, and detection is made with regard to whether there is a foreign object in a transmission space of the wireless power transmission device.

Figure 1:
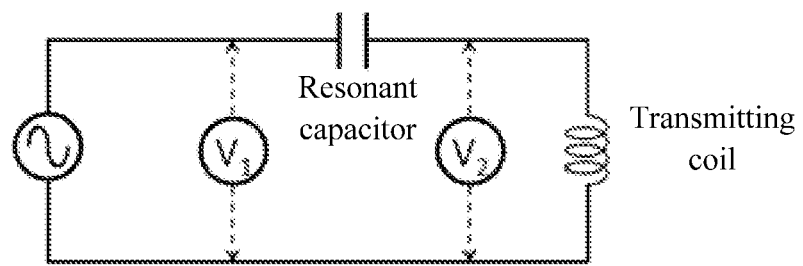
FIG. 1 is a schematic diagram illustrating principles of foreign object detection in related arts.

In related arts, whether there is a foreign metallic object is determined by means of detecting a Q-value of a transmitting coil in a wireless power transmission device. The Q-value refers to a ratio of inductive reactance presented by an inductor to its equivalent loss resistance when the inductor operates at a certain frequency of alternating voltage. As shown in FIG. 1, in calculating the Q-value of the coil, it is necessary to allow a resonant network (such as a resonant capacitor C and an inductor L for the transmitting coil) to operate at a resonant frequency $$f = \frac{1}{2\pi\sqrt{LC}},$$

and by means of detecting a voltage $V_2$ across the transmitting coil and an input voltage $V_1$ of the resonant network, the Q-value of the coil is calculated according to $$Q = \frac{V_2}{V_1}.$$

When there is a foreign metallic object, the Q-value calculated through the detection will decrease. Since the voltage across the transmitting coil is very high at the resonant frequency, it is usually necessary to adjust the input voltage of the resonant network to a relatively small value. Therefore, this solution requires an additional voltage regulating circuit; moreover, it takes a long time to find the resonant frequency through frequency sweeping.

Figure 2:
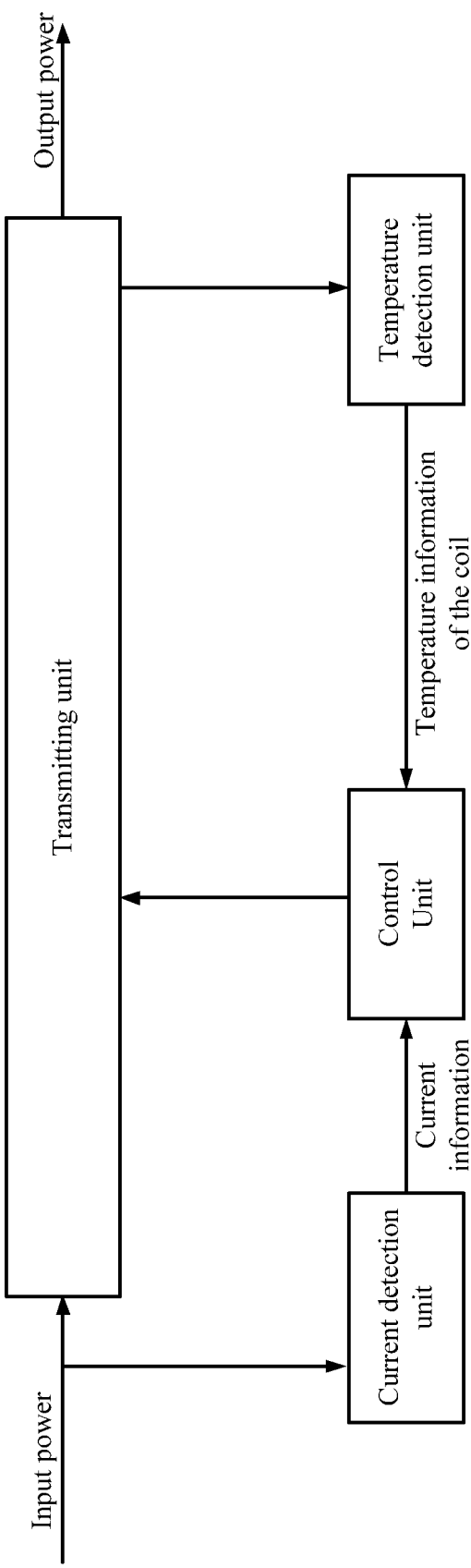
FIG. 2 is a schematic structural diagram of a wireless power transmission device according to an embodiment of the present application.

As shown in FIG. 2, the wireless power transmission device according to an embodiment of the present application includes a transmitting unit, and a current detection unit, a temperature detection unit and a control unit respectively connected to the transmitting unit, where the control unit is respectively connected to the current detection unit and the temperature detection unit.

The method according to the embodiment of the present application allows for determining whether there is a foreign object on the transmitting coil by detecting an electrical parameter, such as an input current of the transmitting unit for comparison with a current parameter when there is no foreign object. Detection of the foreign object is achieved without the presence of an additional hardware structure.

Technical solutions of the present application will be described in detail hereunder with specific embodiments. The following specific embodiments can be combined with each other and, for the same or similar concepts or processes, details may not be described again in some embodiments.

Figure 3:
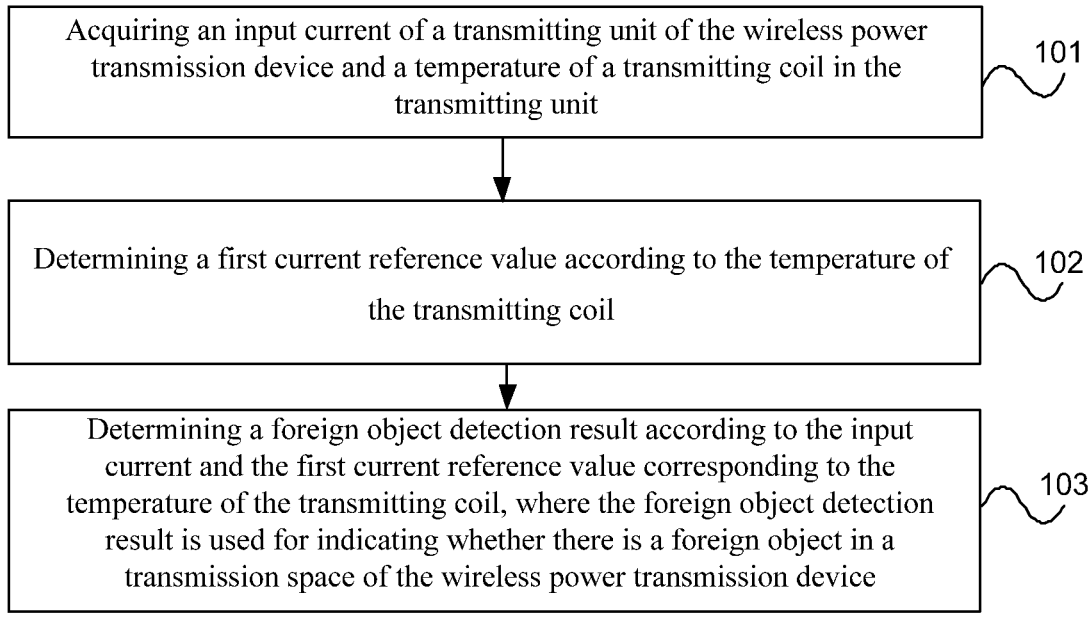
FIG. 3 is a schematic flowchart of a foreign object detection method for a wireless power transmission device according to an embodiment of the present application.

FIG. 3 is a schematic flowchart of a foreign object detection method for a wireless power transmission device according to an embodiment of the present application. As shown in FIG. 3, the method provided in this embodiment includes:

Step 101, acquiring an input current of a transmitting unit of the wireless power transmission device and a temperature of a transmitting coil in the transmitting unit.

In some embodiments, an input current of a transmitting unit of the wireless power transmission device may be detected by the current detection unit, and a temperature of a transmitting coil in the transmitting unit may be detected by the temperature detection unit.

Step 102, determining a first current reference value according to the temperature of the transmitting coil.

In some embodiments, the control unit acquires the input current of the transmitting unit from the current detection unit; the control unit detects the temperature T of the transmitting coil through the temperature detection unit, and calculates a first current reference value $I_{ref}$ corresponding to the current temperature T.

Step 103, determining a foreign object detection result according to the input current and the first current reference value corresponding to the temperature of the transmitting coil, where the foreign object detection result is used for indicating whether there is a foreign object in a transmission space of the wireless power transmission device.

The foreign object is, for example, a foreign metallic object, a magnetic material, or the like.

Introduction to implementation principles of the method according to the embodiment of the present application will be made hereunder by taking an example where the compensation circuit is of series capacitors.

Figure 4:
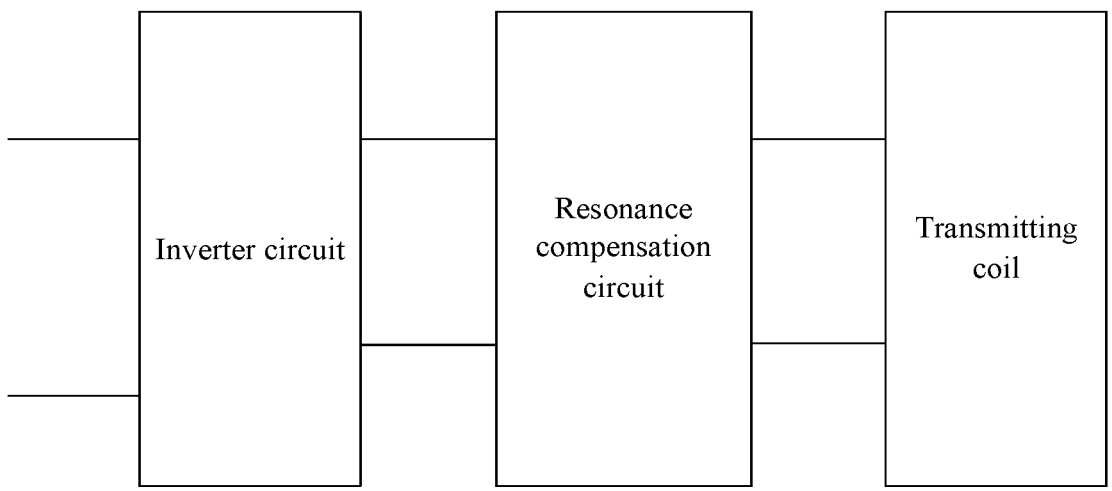
FIG. 4 is a schematic structural diagram of a transmitting unit according to an embodiment of the present application.
Figure 5:
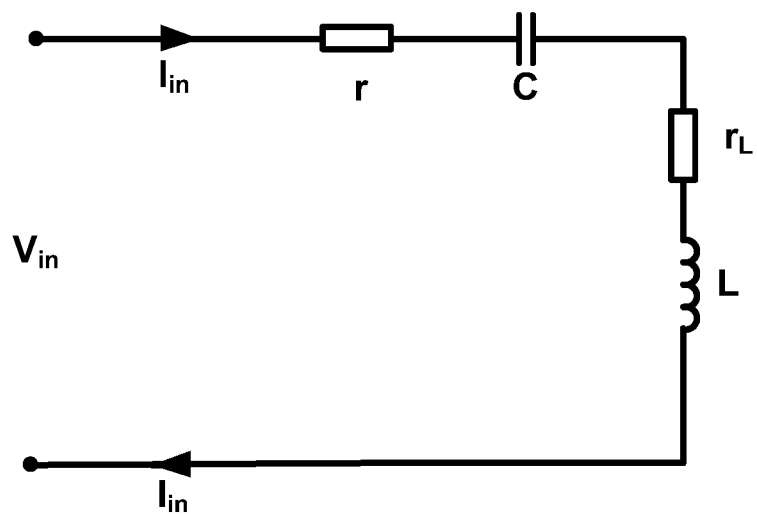
FIG. 5 is an equivalent circuit diagram of a transmitting unit according to an embodiment of the present application.

FIG. 4 is a schematic structural diagram of a transmitting unit according to an embodiment of the present application. As shown in FIG. 4, the transmitting unit includes: an inverter circuit, a resonance compensation circuit, and a transmitting coil. One end of the resonance compensation circuit is connected to the inverter circuit and the other end is connected to the transmitter coil. When there is no foreign object, the transmitting unit receives an input voltage $V_{in}$ and an input current $I_{in}$. An equivalent circuit diagram of the transmitting unit is shown in FIG. 5, where r is equivalent impedance of the inverter circuit, C is compensation capacitance, $r_L$ is internal resistance of the transmitting coil, and L is inductance of the transmitting coil.

Figure 6:
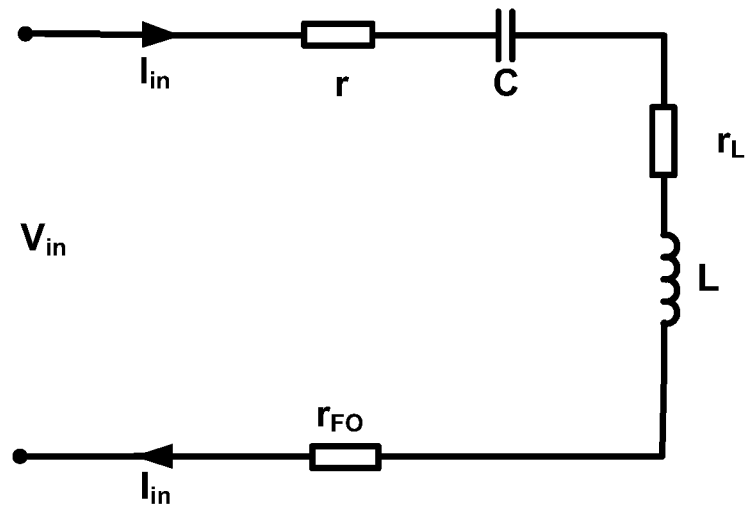
FIG. 6 is an equivalent circuit diagram of the transmitting unit according to another embodiment of the present application.

When there is a foreign object on the transmitting coil, the alternating magnetic field will cause loss inside the foreign metallic object, equivalent to adding a resistor $r_{Fo}$ to the circuit. The equivalent circuit is shown in FIG. 6 below.

After $I_{in}$ is subjected to low-pass filtering, its average value may be derived. When there is a foreign object on the transmitting coil, the loss on the foreign object causes $I_{in(av)}$ to increase. At the same time, generally, the temperature will also affect the magnitude of $I_{in(av)}$ upon its impact on the magnitude of r or $r_L$. Therefore, the detection of the foreign object on the transmitting coil may be achieved by means of determining a relationship between $I_{in(av)}$ and, a preset current reference value or a current threshold determined according to the temperature of the coil.

The method in this embodiment allows for: acquiring an input current of a transmitting unit of the wireless power transmission device and a temperature of a transmitting coil in the transmitting unit; determining a first current reference value according to the temperature of the transmitting coil; and determining whether there is a foreign object in a transmission space of the wireless power transmission device, by the input current of the transmitting unit of the wireless power transmission device and the first current reference value corresponding to the temperature of the transmitting coil. In the present scheme, according to the temperature of the transmitting coil, the first current reference value corresponding to the temperature is determined, thereby eliminating an error that may be caused by the temperature and achieving more accurate foreign object detection with no extra hardware structure.

In an embodiment, Step 102 may be implemented in the following manner:

acquiring a preset current reference value corresponding to a preset temperature; and updating the preset current reference value according to the temperature of the transmitting coil to obtain the first current reference value.

Wherein, the control unit enables the inverter circuit in the transmitting unit to operate at a preset frequency, so that the transmitting coil is excited. Therefore, the input current $I_{in}$ of the inverter circuit is generated. The current detection unit detects the input current and outputs it to the control unit. Further, the control unit acquires a preset temperature $T_{initial}$ and a preset current reference value $I_{initial}$ corresponding to the preset temperature $T_{initial}$. Moreover, the preset current reference value $I_{initial}$ is updated according to the temperature T of the transmitting coil to obtain the first current reference value $I_{ref}$.

In an embodiment, the updating the preset current reference value to obtain the first current reference value includes: determining a scale factor; and calculating the first current reference value according to the scale factor, the preset temperature, the preset current reference value, and the temperature of the transmitting coil.

Wherein, a scale factor k may be set; the first current reference value $I_{ref}$ is calculated according to the scale factor k, the preset temperature $T_{initial}$, the preset current reference value $I_{initial}$, and the temperature T of the transmitting coil. In an embodiment, the first current reference value is calculated by Formula:

$$I_{ref} = k \times (T - T_{initial}) + I_{initial}$$

It should be noted that the above formula can also be modified, which is not limited in the embodiment of the present application.

In the above embodiment, the first current reference value is calculated through the scale factor, the preset temperature, the preset current reference value, and the temperature of the transmitting coil, which may effectively reduce or avoid impacts from an environmental temperature change on detection accuracy, and may effectively reduce or avoid impacts from parameter tolerance on detection accuracy.

Further, in some embodiments, the scale factor k may be a preset value, and may be artificially set in advance according to actual needs. In other embodiments, the scale factor k may be a ratio of a difference between average values of two input currents obtained at two different temperatures to a difference between the two temperatures. The scale factor k is calculated by Formula:

$$k = \frac{I_{initial2} - I_{initial1}}{T_2 - T_1}$$

$T_1$ and $T_2$ are the two different temperatures of the coil, and $I_{initial1}$ and $I_{initial2}$ are the average values of corresponding input currents at the two different temperatures.

For example, when the wireless power transmission device enters a calibration state, the current detection unit acquires an average value of an input current of the transmitting unit, and the temperature detection unit acquires a temperature of the transmitting coil, respectively referred to as $I_{initial1}$ and $T_1$.

Further, the wireless power transmission device may be allowed to operate for a period of time, so that the temperature of the transmitting coil rises to another temperature $T_2$, and the current detection unit acquires an average value $I_{initial2}$ of an input current of the transmitting unit at this time; the scale factor k may be calculated according to $T_1$, $T_2$, $I_{initial1}$ and $I_{initial2}$.

In an embodiment, Step 103 may be implemented in the following manner:

determining a current threshold according to the first current reference value; and acquiring an average value of the input current, and comparing the average value of the input current with the current threshold to determine the foreign object detection result.

Under a circumstance that the average value of the input current is greater than the current threshold, the foreign object detection result is used for indicating that there is a foreign object in a transmission space of the wireless power transmission device.

Wherein, a current threshold $I_{th}$ is calculated according to the first current reference value $I_{ref}$, e.g., it is calculated through $I_{th}=I_{ref}+a$ or $I_{th}=I_{ref}\times(1+b\%)$, where a and b are preset constants.

Acquiring an average value $I_{in(av)}$ of the input current, and comparing $I_{in(av)}$ with $I_{th}$ to determine the foreign object detection result.

If $I_{in(av)}>I_{th}$ is satisfied, it is determined that there is a foreign object on the transmitting coil, and the control unit controls the inverter circuit to stop working, that is, terminates the operation of the transmitting unit.

In the above embodiment, the loss of the foreign object may be reflected through detection on a change in an average value of the input current of an inverter unit, thereby quickly determining whether there is a foreign object, with low implementation complexity and high detection accuracy.

FIG. 2 is a schematic structural diagram of a wireless power transmission device according to an embodiment of the present application. As shown in FIG. 2, the wireless power transmission device in this embodiment includes: a transmitting unit, and a current detection unit, a temperature detection unit and a control unit respectively connected to the transmitting unit, where the control unit is respectively connected to the current detection unit and the temperature detection unit. Wherein, the current detection unit is configured to detect an input current of a transmitting unit; the temperature detection unit is configured to acquire a temperature of a transmitting coil in the transmitting unit; the control unit is configured to determine a corresponding first current reference value according to the temperature of the transmitting coil provided by the temperature detection unit; and determine a foreign object detection result according to the input current provided by the current detection unit and the first current reference value, where the foreign object detection result is used for indicating whether there is a foreign object in a transmission space of the wireless power transmission device.

The wireless power transmission device according to the embodiment of the present application allows for determining whether there is a foreign object on the transmitting coil by means of detecting an electrical parameter, such as an input current of the transmitting unit for comparison with a current parameter when there is no foreign object. Detection of the foreign object is achieved without the presence of an additional hardware structure.

Wherein, the control unit may detect an input current $I_{in}$ of a transmitting unit of the wireless power transmission device through the current detection unit, and detect a temperature T of the transmitting coil in the transmitting unit through the temperature detection unit. Further, the control unit calculates a first current reference value $I_{ref}$ corresponding to the current temperature T, for determining whether there is a foreign object.

Figure 7:
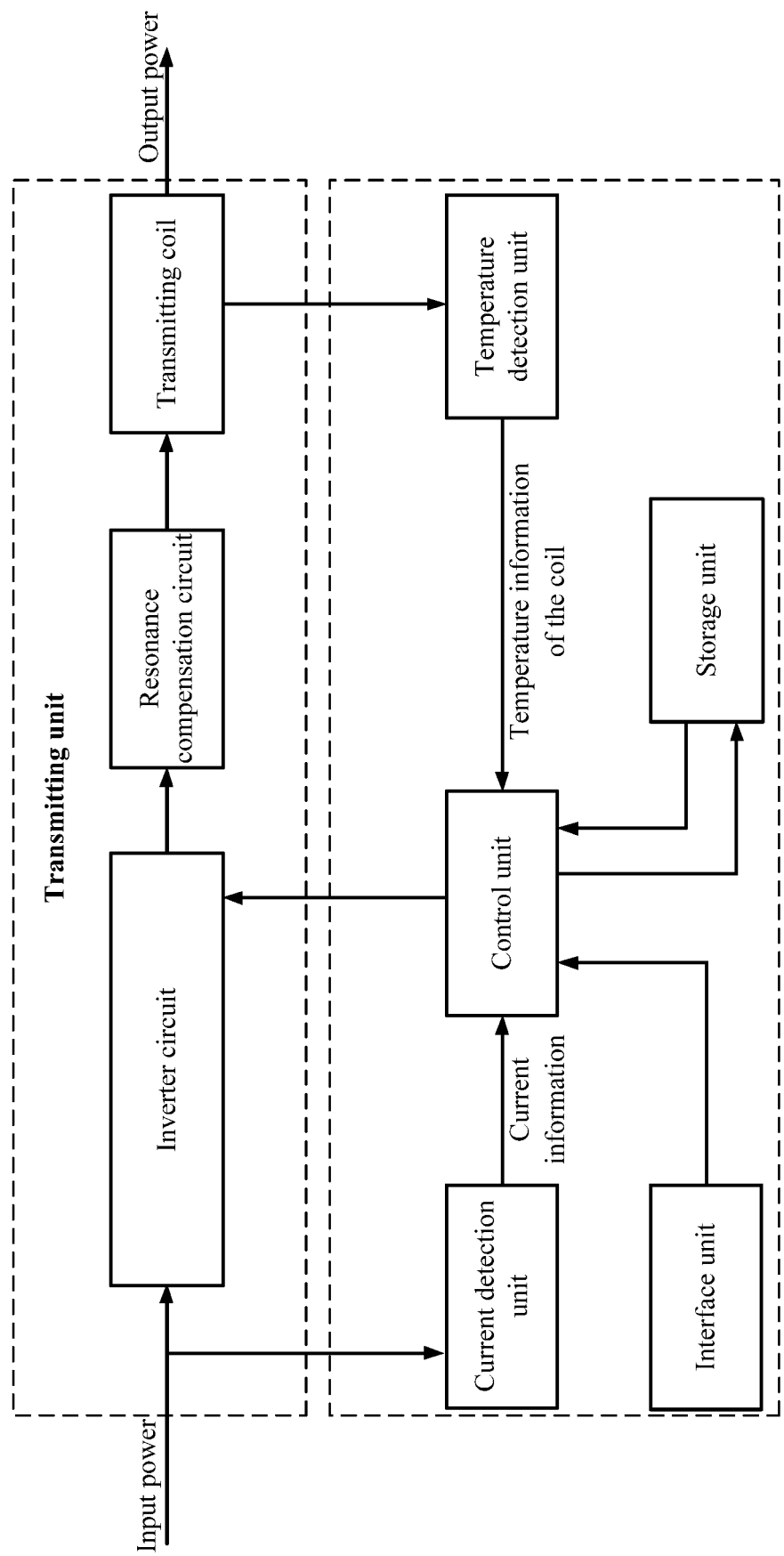
FIG. 7 is a schematic structural diagram of a wireless power transmission device according to another embodiment of the present application.

In a possible implementation, as shown in FIG. 7, the device further includes a storage unit connected to the control unit. The storage unit is configured to store a preset temperature and a preset current reference value corresponding to the preset temperature; and the control unit acquires the preset current reference value from the storage unit, and updates the preset current reference value according to the temperature of the transmitting coil to obtain the first current reference value.

Wherein, the control unit enables the inverter circuit in the transmitting unit to operate at a preset frequency, so that the transmitting coil is excited. Therefore, the input current $I_{in}$ of the inverter circuit is generated. The current detection unit detects the input current and outputs it to the control unit. The control unit acquires a preset temperature $T_{initial}$ and a preset current reference value $I_{initial}$ corresponding to the preset temperature $T_{initial}$ from the storage unit.

The control unit updates the preset current reference value $I_{initial}$ according to the temperature T of the transmitting coil detected by the temperature detection unit. Further, the control unit calculates the first current reference value $I_{ref}$ according to the scale factor k, the preset temperature $T_{initial}$, the preset current reference value $I_{initial}$, and the temperature T of the transmitting coil. In an embodiment, the first current reference value $I_{ref}$ is calculated by Formula:

$$I_{ref}=k\times(T-T_{initial})+I_{initial}$$

It should be noted that the above formula can also be modified, which is not limited in the embodiment of the present application.

In the above embodiment, the first current reference value is calculated through the scale factor, the preset temperature, the preset current reference value, and the temperature of the transmitting coil, which may effectively reduce or avoid impacts from an environmental temperature change on detection accuracy, and may effectively reduce or avoid impacts from parameter tolerance on detection accuracy.

The storage unit may be a non-volatile storage unit. In a possible implementation, the scale factor k is also stored in the storage unit in advance. In some embodiments, the scale factor is a preset value, and may be artificially set in advance according to actual needs. For example, the set preset value may be directly written into the storage unit. In some other embodiments, during a factory test, the scale factor calculated under actual conditions is written into the storage unit through calibration.

Figure 8:
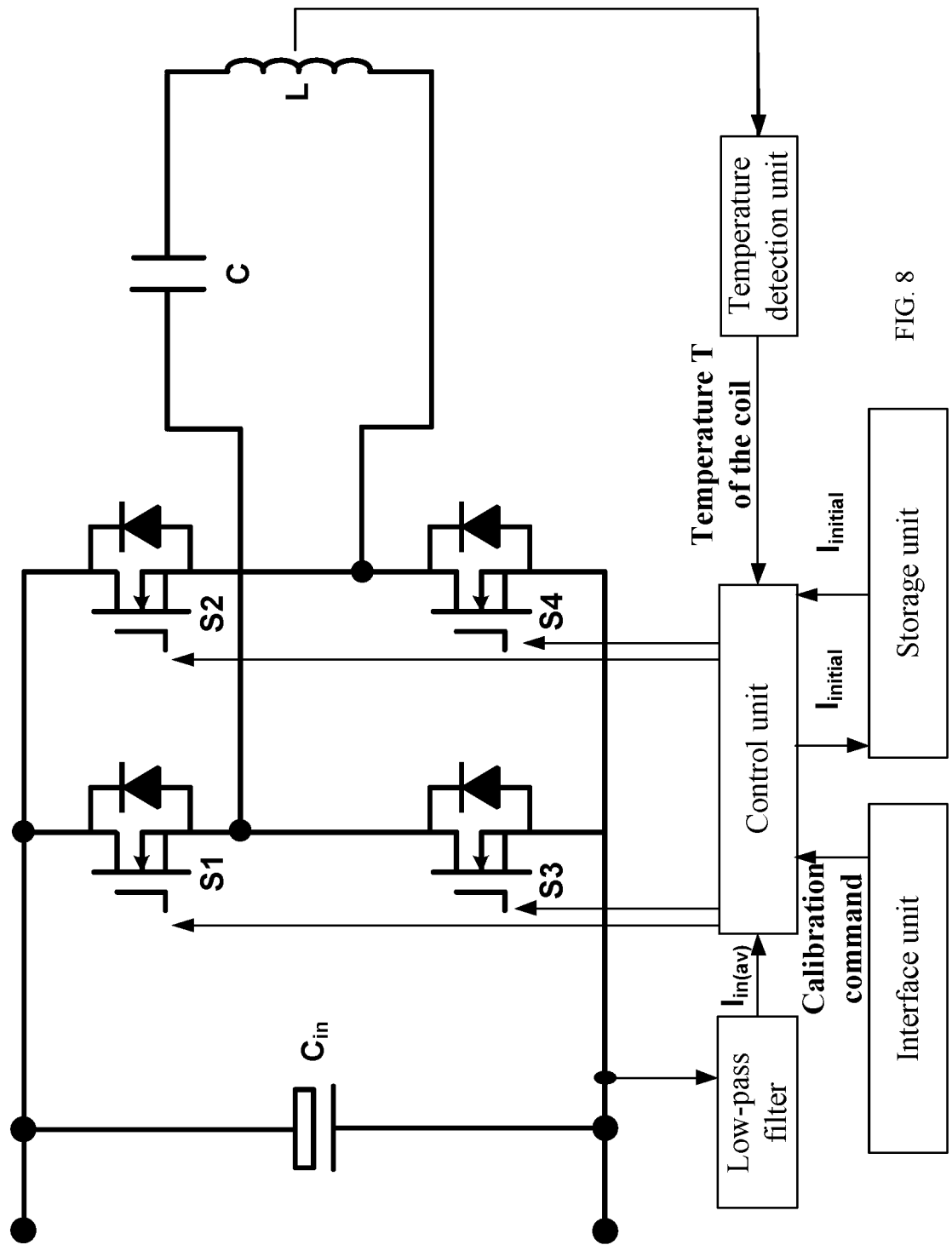
FIG. 8 is a schematic diagram illustrating a specific structure of a wireless power transmission device according to an embodiment of the present application.

Further, in an embodiment, as shown in FIG. 8, the current detection unit includes a low-pass filter configured to acquire an average value $I_{in(av)}$ of the input current; the control unit determines a current threshold $I_{th}$ according to the first current reference value; and compares the average value $I_{in(av)}$ of the input current with the current threshold to determine the foreign object detection result. Under a circumstance that the average value of the input current is greater than the current threshold, the foreign object detection result is indicated that there is a foreign object in a transmission space of the wireless power transmission device.

In some embodiments, a current threshold $I_{th}$ is calculated, e.g., it is calculated through $I_{th}=I_{ref}+a$ or $I_{th}=I_{ref}*(1+b\%)$, where a and b are preset constants.

Acquiring an average value $I_{in(av)}$ of the input current, and comparing $I_{in(av)}$ with $I_{th}$ to determine the foreign object detection result.

If $I_{in(av)}>I_{th}$ is satisfied, it is determined that there is a foreign object on the transmitting coil, and the control unit terminates the operation of the inverter circuit.

FIG. 7 is a schematic structural diagram of a wireless power transmission device according to another embodiment of the present application. As shown in FIG. 7, the device further includes an interface unit connected to the control unit. The interface unit is configured to control the device to enter a calibration state; and the control unit is configured to acquire an average value of input current corresponding to a first temperature, and store the first temperature as the preset temperature and the corresponding average value of input current as the preset current reference value into the storage unit.

In an embodiment, the control unit is further configured to: acquire an average value of input current corresponding to a second temperature; determine the scale factor according to the average value of input current corresponding to the first temperature and the average value of input current corresponding to the second temperature; and store the scale factor into the storage unit. The scale factor is a ratio of a difference between the average value of input current corresponding to the first temperature and the average value of input current corresponding to the second temperature to a difference between the first temperature and the second temperature.

Wherein, the interface unit may be a human-machine interface unit. An operator or a tester confirms that there is no foreign object on the transmitting coil, and operates the interface unit to enable the wireless power transmission device to enter a calibration state. The operation of the interface unit may be achieved in the following ways:

One way: performing a pressing or releasing operation on a certain mechanical button.

Another way: transmitting a certain communication command to a communication interface (an Ethernet interface, a Controller Area Network-BUS (CAN-Bus) interface, etc.) in the interface unit.

The wireless power transmission device enters a calibration state, the current detection unit acquires an average value of an input current of the transmitting unit to use it as the preset current reference value $I_{initial1}$, and the temperature detection unit acquires a first temperature $T_1$ of the transmitting coil to use the first temperature $T_1$ as the preset temperature $T_{initial}$, and they are stored into the storage unit.

Further, the wireless power transmission device may be allowed to operate for a period of time, so that the temperature of the transmitting coil rises to a further second temperature $T_2$, and the current detection unit acquires an average value of an input current of the transmitting unit at this time, that is, the average value of input current $I_{initial2}$ corresponding to the second temperature $T_2$, the scale factor k may be calculated according to $T_1$, $T_2$, $I_{initial1}$ and $I_{initial2}$, $$k = \frac{I_{initial2} - I_{initial1}}{T_2 - T_1},$$

and it is written into the storage unit

After the storage is completed, the wireless power transmission device exits the calibration state, and the control unit stops enabling the inverter circuit. An automatic exit of the calibration state is possible after a required value is stored, or the exit is possible after the operator or the tester performs an operation on the human-machine interface unit.

In the above embodiment, the calibration function may effectively reduce or avoid impacts from parameter tolerance on detection accuracy.

FIG. 8 is a schematic diagram illustrating a specific structure of a wireless power transmission device according to an embodiment of the present application. As shown in FIG. 8, a full-bridge inverter circuit is formed by S1, S2, S3, and S4, an input terminal of the inverter circuit is connected to a input capacitor $C_{in}$; the resonance compensation circuit is electrically connected to the inverter circuit and the transmitting coil, and is configured to compensate for part of reactive power of the transmitting coil, where the transmitting coil is configured to transmit alternating current electromagnetic energy. As shown in FIG. 8, the resonance compensation circuit is realized by a resonant capacitor, but this case is not limited thereto. The resonance compensation circuit may also be in other forms, such as an inductor and a capacitor. In addition, the inverter circuit may be a half-bridge inverter circuit or a full-bridge inverter circuit, and its form is not limited in this case.

In other embodiments, the transmitting unit may further include a transformer, which realizes voltage conversion. The transformer may be arranged before or after the inverter circuit.

In some embodiments, during foreign object detection, the control unit sets the operating frequency of the inverter circuit to a preset frequency, where the preset frequency is greater than the resonant frequency. The resonant frequency is $$f = \frac{1}{2\pi\sqrt{LC}};$$

where L is inductance of the transmitting coil, and C is resonant capacitance.

In the embodiment of the present application, the operating frequency of the inverter current is greater than the resonant frequency. When there is a foreign object on the coil, the resonant current remains almost unchanged, and the inherent loss of the transmitting unit remains unchanged. Detection of a change in the input current of the inverter circuit can reflect the presence of the foreign object, and the detection has high precision.

Figure 9:
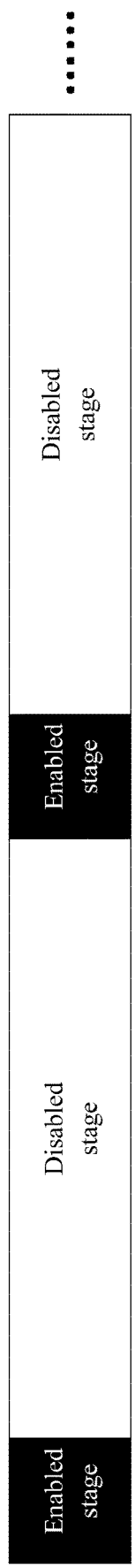
FIG. 9 is a schematic diagram in which a transmitting unit provided in the present application operates intermittently.

Further, in some embodiments, during a foreign object detection stage, the control unit controls the inverter circuit to operate intermittently. Specifically, during the foreign object detection stage, if no foreign object is detected, the enabling of the inverter circuit means continuous consumption of electric energy. Therefore, optionally, the control unit can enable the inverter circuit to operate intermittently. As shown in FIG. 9, the foreign object detection is performed simply in the enabled stage, and the inverter circuit is stopped from operating during the disabled stage, thereby reducing loss.

The device in this embodiment can be used to implement the technical solutions in the foregoing method embodiments. The implementation principles and technical effects are similar, and details will not be described here again.

An embodiment of the present application also provides a computer-readable storage medium on which a computer program is stored. The computer program which, when executed by the control unit, implements the corresponding method in the foregoing method embodiments. For a specific implementation process, reference may be made to the foregoing method embodiments. The implementation principles and technical effects are similar, and details will not be described here again.

Those skilled in the art will readily envisage of other embodiments of the present disclosure after considering the specification and practicing the technical solutions disclosed herein. The present application is intended to cover any variations, uses, or adaptive changes of the present disclosure. These variations, uses, or adaptive changes follow general principles of the present disclosure, and include common knowledge or conventional technical means in the technical field not disclosed in the present disclosure. The specification and the embodiments are merely conceived as exemplary, and the true scope and spirit of the present disclosure are subject to the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A foreign object detection method for a wireless power transmission device, comprising:
    acquiring an input current of a transmitting unit of the wireless power transmission device and a temperature of a transmitting coil in the transmitting unit;
    calculating a first current reference value according to the temperature of the transmitting coil; and
    determining a foreign object detection result according to the input current and the first current reference value corresponding to the temperature of the transmitting coil, wherein the foreign object detection result is used for indicating whether there is a foreign object in a transmission space of the wireless power transmission device,
    wherein the determining the foreign object detection result according to the input current and the first current reference value corresponding to the temperature of the transmitting coil comprises:
    determining a current threshold according to the first current reference value; and
    acquiring an average value of the input current, and comparing the average value of the input current with the current threshold to determine the foreign object detection result.

2. The method according to claim 1, wherein the calculating the first current reference value according to the temperature of the transmitting coil comprises:
acquiring a preset current reference value corresponding to a preset temperature; and
updating the preset current reference value according to the temperature of the transmitting coil to obtain the first current reference value.

3. The method according to claim 2, wherein the updating the preset current reference value according to the temperature of the transmitting coil to obtain the first current reference value comprises:
determining a scale factor; and
calculating the first current reference value according to the scale factor, the preset temperature, the preset current reference value, and the temperature of the transmitting coil.

4. The method according to claim 3, wherein the first current reference value is calculated by formula:

$$I_{ref}=k\times(T-T_{initial})+I_{initial}$$

wherein $I_{ref}$ is the first current reference value, $I_{initial}$ is the preset current reference value, k is the scale factor, $T_{initial}$ is the preset temperature, and T is the temperature of the transmitting coil.

5. The method according to claim 3, wherein the scale factor is a ratio of a difference between average values of two input currents obtained at two different temperatures to a difference between the two temperatures.

6. The method according to claim 1, wherein the comparing the average value of the input current with the current threshold to determine the foreign object detection result comprises:
under a circumstance that the average value of the input current is greater than the current threshold, determining that the foreign object detection result is used for indicating that there is a foreign object in the transmission space of the wireless power transmission device.

7. A wireless power transmission device, comprising: a transmitting unit, and a current detection unit, a temperature detection unit and a control unit respectively connected to the transmitting unit, wherein the control unit is respectively connected to the current detection unit and the temperature detection unit, and wherein:
the current detection unit is configured to acquire an input current of the transmitting unit;
the temperature detection unit is configured to acquire a temperature of a transmitting coil in the transmitting unit;
the control unit is configured to: calculate a first current reference value according to the temperature of the transmitting coil provided by the temperature detection unit; and determine a foreign object detection result according to the input current provided by the current detection unit and the first current reference value, wherein the foreign object detection result is used for indicating whether there is a foreign object in a transmission space of the wireless power transmission device,
wherein the current detection unit comprises a low-pass filter configured to acquire an average value of the input current;
the control unit determines a current threshold according to the first current reference value; and compares the average value of the input current with the current threshold to determine the foreign object detection result.

8. The device according to claim 7, further comprising: a storage unit connected to the control unit, wherein:
the storage unit is configured to store a preset temperature and a preset current reference value corresponding to the preset temperature; and
the control unit acquires the preset current reference value from the storage unit, and updates the preset current reference value according to the temperature of the transmitting coil to obtain the first current reference value.

9. The device according to claim 8, wherein:
the storage unit is further configured to store a scale factor; and
the control unit acquires the scale factor from the storage unit, and calculates the first current reference value according to the scale factor, the preset temperature, the preset current reference value, and the temperature of the transmitting coil.

10. The device according to claim 9, wherein the first current reference value is calculated by formula:

$$I_{ref}=k\times(T-T_{initial})+I_{initial}$$

wherein $I_{ref}$ is the first current reference value, $I_{initial}$ is the preset current reference value, k is the scale factor, $T_{initial}$ is the preset temperature, and T is the temperature of the transmitting coil.

11. The device according to claim 10, wherein the scale factor is a ratio of a difference between average values of two input currents obtained at two different temperatures to a difference between the two temperatures.

12. The device according to claim 9, further comprising an interface unit connected to the control unit, wherein:
the interface unit is configured to control the device to enter a calibration state; and
the control unit is configured to acquire an average value of input current corresponding to a first temperature, and store the first temperature as the preset temperature and the average value of input current corresponding to a first temperature as the preset current reference value into the storage unit.

13. The device according to claim 12, wherein the control unit is further configured to: acquire an average value of input current corresponding to a second temperature; determine the scale factor according to the average value of input current corresponding to the first temperature and the average value of input current corresponding to the second temperature; and store the scale factor into the storage unit.

14. The device according to claim 13, wherein the scale factor is a ratio of a difference between the average value of input current corresponding to the first temperature and the average value of input current corresponding to the second temperature to a difference between the first temperature and the second temperature.

15. The device according to claim 7, wherein:
under a circumstance that the average value of the input current is greater than the current threshold, the control unit determines that the foreign object detection result is used for indicating that there is a foreign object in a transmission space of the wireless power transmission device.

16. The device according to claim 7, wherein the transmitting unit comprises: an inverter circuit, a resonance compensation circuit and the transmitting coil connected in sequence, and the inverter circuit is connected to the current detection unit and the control unit respectively; wherein the control unit controls the inverter circuit to convert input direct current power into alternative current power, and transmit the alternative current power through the transmitting coil.

17. The device according to claim 16, wherein when the input current of the transmitting unit is detected, the control unit controls an operating frequency of the inverter circuit to a preset frequency, wherein the preset frequency is greater than a resonant frequency.

18. The device according to claim 16, wherein during a foreign object detection stage, the control unit controls the inverter circuit to operate intermittently.

* * * * *